April 29, 1969   J. DRABIK   3,441,295
CONCENTRIC PIPE COUPLING HAVING SPRING-BIASED SEALING MEANS
Filed Aug. 26, 1966

Inventor
Josef Drabik
By Bernard H. Michael
Attorney

3,441,295
CONCENTRIC PIPE COUPLING HAVING SPRING-BIASED SEALING MEANS

Josef Drabik, near Osnabruck, Germany, assignor to G. Kromschroder Aktiengesellschaft, Osnabruck, Germany, a corporation of Germany
Filed Aug. 26, 1966, Ser. No. 575,365
Claims priority, application Germany, Sept. 30, 1965, K 57,264
Int. Cl. F16l *47/00, 19/00, 17/00*
U.S. Cl. 285—133     1 Claim

ABSTRACT OF THE DISCLOSURE

The coupling provides coaxial flow into and out of a measuring or regulating device (not shown but housed in housing 2) and is adapted to be mounted on a pipeline fitting having coaxial seats against which the coupling gaskets seal with the inner gasket being axially movable relative to the fixed outer gasket and biased against its seat to effect a gastight joint independent of the compressive force applied to the outer gasket.

---

The invention relates to a coupling arrangement for gastight connection of a measuring or a control device having suitable concentric liners (to the corresponding concentric joint surfaces of a pipeline fitting).

The installation of measuring and control devices in pipelines is known to have been simplified by combining the inlet and outlet into one coupling unit. This prevented mechanical stresses on the case which arose from connecting two separate pipes into the device.

Since the introduction of pipeline fittings which became known as one-pipe fittings, the sealing of the concentric joints at the inlet and outlet of the connected device occasioned a number of modifications. The duct joints were made in the same plane or in stepped planes.

Known arrangements had the aim of sealing the inner duct securely from the outer duct by sealing rings of differing thicknesses, or to project the inner joint surface slightly beyond the outer joint surface. By increasing negative manufacturing tolerances, the latter arrangement introduced a risk of deforming the supports carrying the inner duct when difficulties arose in installation.

In other known arrangements, the inner duct had a resilient connection to the device, but this proved unsatisfactory at higher pressures and also in sealing the duct to the pipeline fitting.

In further known arrangements, an axially resilient joint was made by fitting the inner ducts of the device and of the pipeline fitting into one another with a compressible packing between their walls, but this again made gastight sealing of the inner duct dependent upon very close manufacturing tolerances.

The known arrangements all aimed at ensuring with certainty a fully positive sealing of the inner duct from the outer duct under the widest range of installation conditions.

Summary of invention

This invention obtains a reliable seal and a secure coupling, even at higher pressures and under all installation conditions, of measuring and control devices with union liners for gastight coupling to a one-pipe fitting in a pipeline having concentric inlet and outlet ducts. This is achieved by provision of an inner liner axially movable within its supports relative to the outer fitting and spring loaded against the plane of the joint. In this way a gastight joint is made with the inner liner by a compressive force determined by the strength of the spring. In contrast to the hitherto known arrangements, this is unaffected by the force coupling the outer fitting to the pipeline fitting which can be of such magnitude as needed to obtain an externally gastight joint. The spring loading of the inner seal assures adequate sealing to accommodate the inlet to outlet pressure drop while the outer seal is independently tightened to assure its integrity.

A particularly simple and practical arrangement is achieved by further arranging that the spring element is a coil spring surrounding the inner liner of the device, abutting at one end on the supports and at the other end on a shoulder around the said liner.

In this embodiment, the coil spring of strength requisite to the necessary compressive force is carried by the inner liner and abuts on the guide formed by the supports. The liner of this arrangement needs no special stops or other special locating elements for a spring, such as would prevent its being turned on a lathe.

The axial movement of the liner is limited by a turned limiting ring and by a connecting piece screwed into it.

An embodiment of the invention will now be more particularly described by way of example by reference to the accompanying drawing in which all parts are shown schematically in section.

Figure 1:
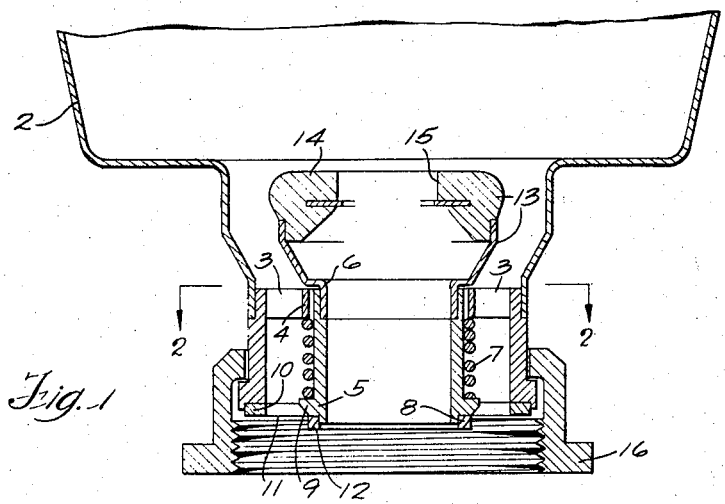
FIG. 1 is a cross section through a coupling on the axial centerline.
Figure 2:
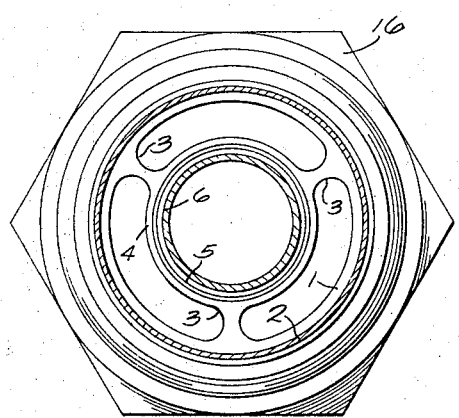
FIG. 2 is a cross section on line 2—2 of FIG. 1.

The main conduit or fitting 1 of the device 2 has a number of support webs 3 which form a concentric guide ring 4 concentric with the inner liner 5, which is axially movable within it. A coil spring 7 carried on the inner liner 5 and abutting on the guide ring 4, abuts also on the shoulder 9 around the liner 5. The axial movement of the inner liner 5 of the device is limited by the member 13 which is gastightly screwed and soldered on to it and which has a shoulder 6 resting upon the supports 3 while the device is not connected: in this position, the joint plane 12 of the inner liner 5 with its compressible sealing washer 8 projects slightly beyond the joint plane 11 of the main conduit 1 with its compressible sealing washer 10.

On coupling the device to cooperating coaxial ducts in a pipeline fitting, by a screwed union 16 or other means, the inner joint is made under the compressive strength of the coil spring 7. The inner liner 5 is thus in all cases soundly coupled (to the pipeline fitting) under the force of the coil spring 7 in any desired orientation of the device 2 in relation to the pipeline. A special advantage arises from the possibility of making the strength of the coil spring 7 to suit requirements, in such a way that a gas-tight joint of the inner duct can be ensured, especially at higher pressures. As the joints are secured the inner liner 5 moves against the spring 7 and opening 15 also moves. It will be understood that the measuring or control device (not shown) contained in housing 2 will accept flow from or deliver flow to port 15. If the upper surface 14 is to serve as a valve seat this movement is no problem. If the mechanism in casing 2 will not tolerate such movement then provision for a suitable sliding or sealed joint inside opening 15 must be made.

The embodiment described is by way of example only and other possibilities exist for keeping the inner liner 5 under spring loading.

I claim:

1. A coupling arrangement for connecting the housing of a fluid measuring or control device to a fluid transmission line provided with concentric fluid conduits comprising
    an outer conduit member secured to and projecting outwardly from the housing,
    an inner conduit member,
    means mounting the inner conduit member within the outer conduit member in spaced concentric relation thereto,
said mounting means including a guide ring disposed in spaced relation to and concentrically within the outer conduit member, said inner conduit being mounted within said ring for limited axial movement.
a ring-supporting web member secured to and extending between the outer conduit member and said ring member respectively,
the ends of said inner and outer conduit members, remote from said housing being provided with annular concentric sealing surfaces disposed respectively in axially spaced planes transverse to the common axis thereof,
and means for positioning the sealing surface of the inner conduit member in a transverse plane more remote from the housing member than is the plane of the sealing surface of the outer conduit member, said last-mentioned means including
axially spaced abutment means carried by the inner conduit member and adjacent opposite ends thereof and lying on opposite sides of the guide ring to limit axial movement of the inner conduit member, and spring means surrounding said inner conduit member with the opposite ends thereof bearing respectively on said ring member and on the abutment means disposed adjacent the seal-bearing end of the inner conduit member for normally maintaining the other of said abutment means in engagement with the opposite face of said guide ring, whereby to maintain the sealing surface of said inner conduit yieldably biased to a position outwardly beyond the sealing surface of said outer conduit member so as to be engaged first by a mating sealing surface carried by the inner conduit of a fluid transmission line having concentric fluid conduits to which the housing may be connected, said sealing surface on said inner conduit member yielding towards said housing until the sealing surfaces of the outer conduit members of the coupling and of the fluid transmission line are engaged.

References Cited

UNITED STATES PATENTS

| | | | |
|---|---|---|---|
| 2,834,373 | 5/1958 | Schwarz et al. | 137—484.2 |
| 2,819,914 | 1/1958 | Eitner | 285—277 X |
| 1,160,703 | 11/1915 | Fleming | 285—133 |
| 2,905,486 | 9/1959 | Goodin et al. | 285—277 X |

FOREIGN PATENTS 503,084  7/1930  Germany.

THOMAS F. CALLAGHAN, *Primary Examiner.*

U.S. Cl. X.R

285—375